United States Patent
Aderhold, Jr. et al.

(10) Patent No.: US 7,578,985 B2
(45) Date of Patent: Aug. 25, 2009

(54) METHOD FOR DIRECT OXIDATION OF HYDROGEN SULFIDE TO ELEMENTAL SULFUR AT LOW TEMPERATURES

(75) Inventors: James L. Aderhold, Jr., Wheaton, IL (US); Nagaraju Palla, Woodridge, IL (US); Keyur Pandya, Elgin, IL (US)

(73) Assignee: Gas Technology Institute, Des Plaines, IL (US)

( * ) Notice: Subject to any disclaimer, the term of this patent is extended or adjusted under 35 U.S.C. 154(b) by 208 days.

(21) Appl. No.: 11/788,078

(22) Filed: Apr. 18, 2007

(65) Prior Publication Data

US 2008/0260611 A1    Oct. 23, 2008

(51) Int. Cl.
*C01B 17/04* (2006.01)
(52) U.S. Cl. .................. 423/210; 423/573.1; 423/576.8
(58) Field of Classification Search ................. 423/210, 423/573.1, 576.8

See application file for complete search history.

(56) References Cited

U.S. PATENT DOCUMENTS

| 6,099,819 | A | 8/2000 | Srinivas et al. |
| 7,060,233 | B1 | 6/2006 | Srinivas et al. |
| 7,291,320 | B2 * | 11/2007 | Geus et al. ............... 423/573.1 |
| 7,357,905 | B2 * | 4/2008 | Chapat et al. .......... 423/244.01 |
| 7,374,742 | B2 * | 5/2008 | Geosits et al. ........... 423/573.1 |
| 2002/0098145 | A1 | 7/2002 | Borsboom et al. |

FOREIGN PATENT DOCUMENTS

WO   WO 2005/068357   7/2005

\* cited by examiner

*Primary Examiner*—Timothy C Vanoy
(74) *Attorney, Agent, or Firm*—Mark E. Fejer

(57) ABSTRACT

A method for removal of hydrogen sulfide and mercury from a gaseous stream containing hydrogen sulfide and mercury in which a hydrogen sulfide conversion catalyst is contacted with the gaseous stream at a temperature less than or equal to the dewpoint of elemental sulfur, and the hydrogen sulfide is oxidized, forming elemental sulfur.

8 Claims, 3 Drawing Sheets

METHOD FOR DIRECT OXIDATION OF HYDROGEN SULFIDE TO ELEMENTAL SULFUR AT LOW TEMPERATURES

BACKGROUND OF THE INVENTION

1. Field of the Invention

This invention relates to a method for removal of hydrogen sulfide from hydrogen sulfide-containing gaseous streams, such as those produced by conventional gasification processes. More particularly, this invention relates to a method for removal of hydrogen sulfide from hydrogen sulfide-containing gaseous streams in which the hydrogen sulfide is directly oxidized at low temperatures to produce elemental sulfur.

2. Description of Related Art

The oxidation of hydrogen sulfide directly to elemental sulfur has been under investigation for several years in conjunction with the conversion of toxic hydrogen sulfide to stable, non-toxic (and sometimes valuable) products, such as elemental sulfur. In recent years, some studies have been directed at the application of direct oxidation to convert the bulk of the hydrogen sulfide in synthesis gas (syngas) from gasification systems to elemental sulfur, for low-cost removal by condensation, before subsequent removal of the remaining hydrogen sulfide to very low levels by conventional or non-conventional absorption-based systems.

Prior studies of the direct oxidation of hydrogen sulfide in a synthesis gas stream having generally encountered problems with the formation of undesirable side products, such as carbonyl sulfide, COS. Furthermore, conventional wisdom has been that the temperature of the catalyst must be sufficiently high to prevent condensation of the elemental sulfur which is formed and the oxygen added must be held close to the stoichiometric levels ($O_2$:$H_2S$ of 0.5) to prevent undesirable oxidation of valuable components of a synthesis gas, primarily CO and hydrogen.

The current state-of-the-art process for converting hydrogen sulfide to sulfur is the Claus process. In the first step of the Claus reaction, about one third of the hydrogen sulfide present in the fluid stream being processed is oxidized to sulfur dioxide, and in the second step, the remaining hydrogen sulfide and the sulfur dioxide are reacted to form sulfur. However, this reaction is limited by thermodynamic equilibrium and only a portion of the sulfur can be recovered. Sulfur recovery can be increased by using multiple stages; however, the levels of sulfur recovery efficiency required to meet current regulations are not achieved. In addition, the Claus process efficiency is affected by even small changes in the composition of the feed gas stream, temperature, or residence time. The presence of carbon dioxide in the feed can result in the formation of undesired carbonyl sulfide, which is difficult to convert to sulfur. In addition, the presence of hydrocarbons in the feed gas stream can result in catalyst deactivation and an overall reduction in process efficiency.

The selective oxidation of hydrogen sulfide to sulfur and water is an attractive method for converting the hydrogen sulfide to sulfur. The selective oxidation reaction is not limited by equilibrium and high sulfur recovery efficiencies are possible in a single stage. However, the production of sulfur dioxide as a byproduct has been a significant problem with selective hydrogen sulfide oxidation catalysts. Indeed, hydrogen sulfide can be completely oxidized to sulfur dioxide; any sulfur formed from hydrogen sulfide can be further oxidized to sulfur dioxide; and sulfur that is formed can also react with water to form hydrogen sulfide and sulfur dioxide.

SUMMARY OF THE INVENTION

It is, thus, one object of this invention to provide a method for removal of hydrogen sulfide from hydrogen sulfide-containing gaseous streams.

It is one object of this invention to provide a method for direct oxidation of hydrogen sulfide to produce sulfur which addresses the problems associated with conventional hydrogen sulfide oxidation methods.

These and other objects of this invention are addressed by a method for removal of hydrogen sulfide from a hydrogen sulfide-containing gaseous stream comprising the steps of contacting a hydrogen sulfide conversion catalyst disposed in a catalytic reactor with the hydrogen sulfide-containing gaseous stream at a temperature less than or equal to the dew-point of elemental sulfur in the catalytic reactor and oxidizing the hydrogen sulfide in the catalytic reactor to form elemental sulfur. The method of this invention may be carried out at $O_2$:$H_2S$ ratios significantly greater than stoichiometric, that is greater than about 0.5. The hydrogen sulfide-containing gaseous stream has a flow rate suitable for providing a space velocity in a range of about 100 to about 2000 volumetric hourly space velocity (VHSV). In contrast to conventional processes and wisdom which hold that no low-temperature conditions can be found where condensation of sulfur will not block active sites on the catalyst surface, the method of this invention is carried out below temperatures required to prevent condensation of the elemental sulfur that is formed and at stoichiometric levels greater than 0.5 with high selectivity to elemental sulfur.

The method of this invention is suitable for use with any hydrogen sulfide-containing gaseous stream, but is particularly suitable for use with synthesis gases from gasification processes. The method of this invention reduces the cost for hot cleanup of synthesis gases by bulk removal of the initial seventy to ninety-plus percent of the hydrogen sulfide as elemental sulfur in a gas-phase, catalytic reactor.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1A:
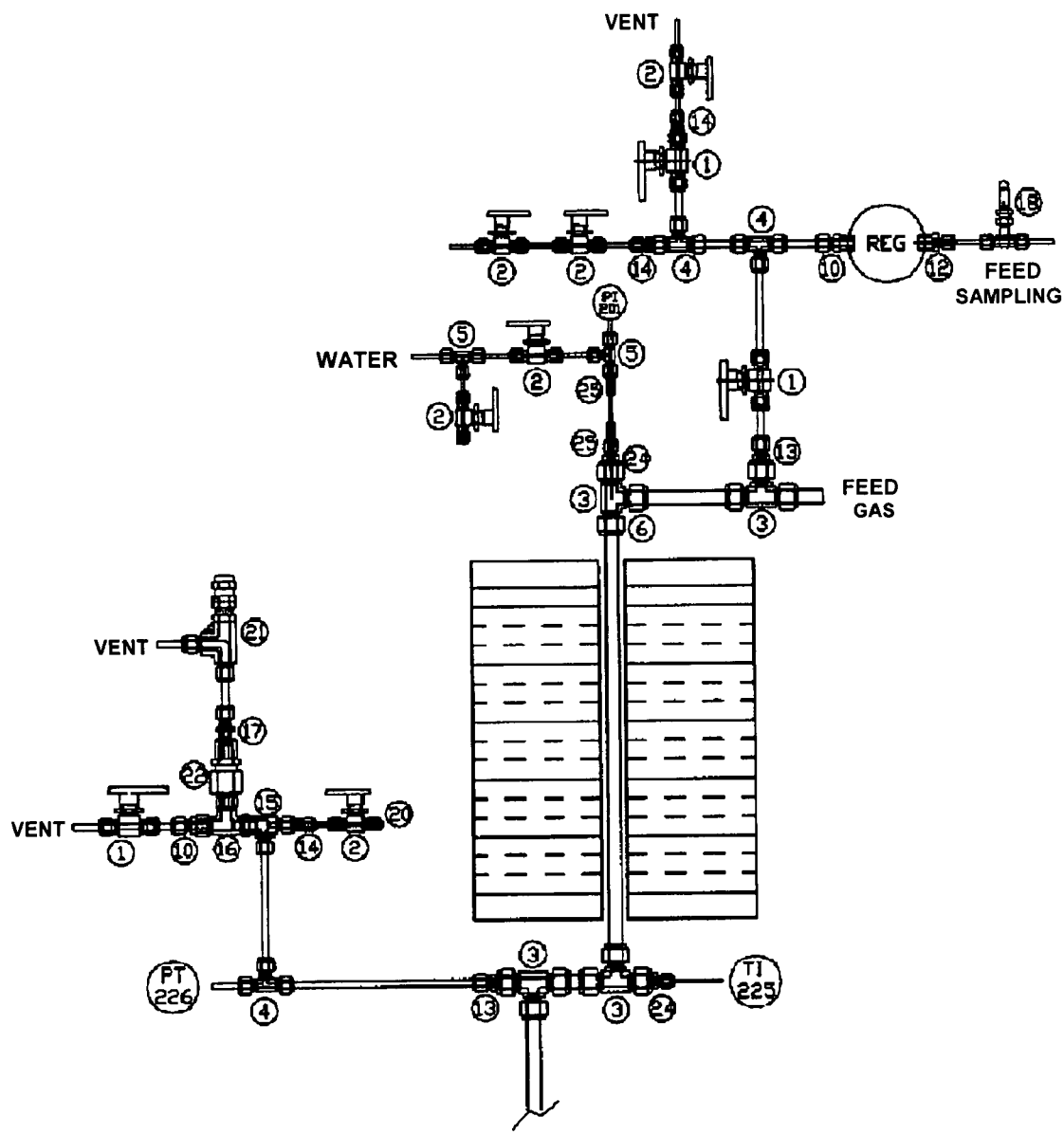
FIGS. 1a and 1b are schematic diagrams of a direct oxidation-catalytic test unit (DO-CTU) employed for testing the method of this invention.

As previously indicated, the present invention involves the discovery of combinations of catalysts and process conditions where high amounts of the desirable formation of elemental sulfur can be achieved at relatively low temperatures and $O_2$:$H_2S$ ratios significantly greater than about 0.5 with high selectivity to elemental sulfur. More particularly, the method of this invention involves the direct oxidation of hydrogen sulfide at temperatures less than or equal to the dewpoint of elemental sulfur and $O_2$:$H_2S$ ratios significantly greater than about 0.5 to produce elemental sulfur. The oxidation of hydrogen sulfide to sulfur proceeds according to the following reaction:

$$H_2S + \tfrac{1}{2}O_2 = H_2O + S$$

and is carried out in the presence of a hydrogen sulfide conversion catalyst, of which there are many known to those skilled in the art. See, for example, U.S. Pat. No. 6,099,819 to Srinivas et al., which teaches numerous catalysts suitable for the selective oxidation of hydrogen sulfide to elemental sulfur.

It will be appreciated by those skilled in the art that the dewpoint of elemental sulfur is a function of a number of factors, including but not limited to, gaseous stream composition and gaseous stream pressure. Accordingly, the stated temperatures for exemplary embodiments of the invention disclosed herein are below the dewpoint of elemental sulfur for the given operating conditions.

To evaluate the method of this invention, tests were carried out in a catalyst test unit (CTU). The feed to the catalysts was synthesized from blended gases, and the composite feed simulated a typical synthesis gas from a gasification reactor. The synthetic synthesis gas feed was formulated by metering in appropriate flow rates of cylinder gases, using mass flow controllers, so that the final gas composition passing over the catalyst was similar to that of a typical coal gasifier synthesis gas composition. The moisture content was obtained by pumping liquid water into a heated vaporizer, upstream of the catalyst reactor, using a chemical metering pump.

EXAMPLE 1

In this example, summarized in Table 1 herein below, hydrogen sulfide was oxidized by air addition to a simulated synthesis gas, with conversion of the hydrogen sulfide being in the range of about 58% to about 69%. Elemental sulfur yields, as a percentage of the converted hydrogen sulfide, were in the range of about 73% to about 79%. As the oxygen to hydrogen sulfide ratio was increased to as high as about 0.9, the conversion of hydrogen sulfide increased as did the selectivity to elemental sulfur, with very little reaction of oxygen with the carbon monoxide or hydrogen components of the simulated synthesis gas.

These results were obtained using a 1-inch nominal pipe size reactor (CTU) with 40 grams of a fresh catalyst designated UOP S-7001 obtained from UOP, which catalyst was in the form of 5 mm by 5 mm pellets, loaded neat with no glass beads or other diluent in the reactor. The length of the catalyst was about 6½ inches. The volume of catalyst, measured in a standard 1-inch graduate, was 61 cubic centimeters, which yields a density of about 0.66 gm/cc. The reactor was pressurized to about 360 psig with nitrogen, and a nitrogen flow was established. The system was heated with the flowing nitrogen to a catalyst temperature of about 385° F. When temperatures had stabilized, hydrogen sulfide and air were blended into the nitrogen feed gas. After these flows had stabilized for about 15 minutes, carbon dioxide, carbon monoxide, and hydrogen were added to the feed blend. The total flow rate, from the sum of the mass flow controller indicated rates, was about 14.7 Slpm (standard liters per minute). The composition of the blended feed was approximately as follows:

| | |
|---|---|
| Hydrogen sulfide | 4300 ppm-v |
| Oxygen | 2000 ppm-v |
| Hydrogen | 13% by volume |
| Carbon monoxide | 10% by volume |
| Carbon dioxide | 1.7% by volume |
| Nitrogen | balance |

In order to determine that the feed composition was near the desired levels, the analytical system was supplied with a slipstream of the blended feed initially. As the measured values stabilized and were determined to be within an acceptable range, the sampling system was switched to route a slipstream of the reactor product to an analyzer. After monitoring the reactor product composition and observing it to stabilize, the sampling system was switched back to measure check the feed composition. The composition of the feed was then monitored for about six samples over about 15 minutes until it stabilized. This segment of the test was designated as Period "A".

The oxygen content of the blended syngas feed was then increased to raise the oxygen-to-hydrogen sulfide molar ratio from slightly below stoichiometric (for production of elemental sulfur, $O_2:H_2S=0.5$) to slightly above stoichiometric level. The sequence of measuring the composition of the feed, then the reactor product, and finally rechecking the blended feed was designated as Period "B".

Because the conversion of hydrogen sulfide increased significantly with the increase in $O_2:H_2S$ ratio, and because the yield of the undesirable side product COS (carbonyl sulfide) did not change substantially, the concentration of oxygen in the blended feed was increased in two more increments. These additional sequences of measuring the composition of the feed, then the reactor product, and finally rechecking the blended feed were designated as Periods "C" and "D". After completion of Period "D", the procedure was terminated.

A Varian Model CP-4900 Micro-GC equipped with two columns, 1) molecular sieve with thermal conductivity detector for oxygen, nitrogen, carbon monoxide and hydrogen and 2) Poropak Q with a thermal conductivity detector for hydrogen sulfide, carbonyl sulfide, sulfur dioxide and carbon dioxide, was employed for measuring the composition of the feed and product streams. The overall results from this procedure are set forth in Table 1 herein below.

TABLE 1

| | Experimental Summary | | | |
|---|---|---|---|---|
| | A | B | C | D |
| Designation Time | | | | |
| Start | 13:30 | 16:00 | 17:45 | 19:20 |
| Finish | 15:55 | 17:40 | 19:15 | 21:00 |
| Process Conditions | | | | |
| Pressure, psig | 360 | 360 | 360 | 360 |
| Temperature, ° F. | | | | |

TABLE 1-continued

Experimental Summary

|  | A | | B | | C | | D | |
|---|---|---|---|---|---|---|---|---|
| Max | 395 | | 390 | | 390 | | 390 | |
| Average | 380 | | 380 | | 380 | | 380 | |
| VHSV | 900 | | 900 | | 900 | | 900 | |
| Feed Concentrations | | | EST | | | | | |
| $H_2S$ | 4350 | 4330 | 4300 | 4300 | 4330 | 4210 | 4180 | 4206 |
| $O_2$ | 2075 | 1925 | 2480 | 2480 | 3130 | 3140 | 3770 | 3740 |
| $O_2/H_2S$ | 0.48 | 0.44 | 0.58 | 0.58 | 0.72 | 0.75 | 0.90 | 0.89 |
| $H_2$ | 13.05% | 13.05% | 12.94% | 12.94% | 12.96% | 12.92% | 12.85% | 12.82% |
| CO | 10.20% | 10.15% | 10.08% | 10.08% | 10.08% | 10.13% | 10.12% | 10.10% |
| $CO_2$ | 1.70% | 1.73% | 1.73% | 1.73% | 1.73% | 1.72% | 1.68% | 1.66% |
| Product Concentrations | | | | | | | | |
| $H_2S$ | 1820 | | 1580 | | 1355 | | 1050-1300 | |
| $O_2$ | 625 | | 1085 | | 1635 | | 2005-2260 | |
| $SO_2$ | 0 | | 0 | | 0 | | 0 | |
| COS | 690 | | 660 | | 635 | | 680-610 | |
| $H_2$ | 12.95% | | 12.94% | | 12.87% | | 12.80% | |
| CO | 10.10% | | 10.12% | | 10.10% | | 10.08% | |
| $CO_2$ | 1.78% | | 1.73% | | 1.72% | | 1.69% | |
| $H_2O$ | | | | | | | | |
| Product Distribution | | | | | | | | |
| $H_2S$ Conversion | 58.1% | | 63.3% | | 68.3% | | 69.0% | |
| COS Yield (Pct. Fd. H2S) | 15.9% | | 15.3% | | 14.9% | | 14.5% | |
| $SO_2$ Yield (Pct. Fd. H2S) | 0 | | 0 | | 0 | | 0 | |
| Est. Elem Sulfur Yield (Pct. Fd) | 42.2% | 73% | 47.9% | 76% | 53.4% | 78% | 54.4% | 79% |
| Oxygen balance (Prelim, ppm) | | | | | | | | |
| Consumed (F—P) | 1375 | | 1395 | | 1500 | | 1495 | |
| $H_2S$ Rxn | 1260 | | 1360 | | 1485 | | 1446 | |
| H2 Rxn | 500 | | 0 | | 350 | | 175 | |
| $CO_2$ Production | 325 | | 0 | | −25 | | 100 | |
| CO Rxn | 375 | | −200 | | 25 | | 150 | |
| Sum of reactions | 2085 | 152% | 1360 | 97% | 1783 | 119% | 1721 | 115% |
| Sulfur Balance (Prelim, ppm) | | | | | | | | |
| $H_2S$ Conversion | 2520 | | 2720 | | 2915 | | 2893 | |
| COS made | 690 | | 660 | | 635 | | 610 | |
| $SO_2$ made | 0 | | 0 | | 0 | | 0 | |
| Elem Sulfur (Diff) | 1830 | 73% | 2060 | 76% | 2280 | 78% | 2283 | 79% |
| Sulfur Dewpoint, °F. | 405 | | 415 | | 420 | | 425 | |

The salient points from an analysis of the steady state segments of this test can be summarized as follows. During the initial portion of Period A, the level of hydrogen sulfide in the product decreased with time on stream, ultimately stabilizing at about 1820 ppmv. The product concentration of the carbonyl sulfide stabilized at about 690 ppmv. There was unconverted oxygen present in the product at a concentration of about 625 ppmv, but no sulfur dioxide was measured in the product during this or any subsequent experimental periods. Because there is no analytical method for direct measurement of the elemental sulfur, it was estimated by way of a material balance on the sulfur in and out.

During this Period A, the hydrogen sulfide conversion was about 58%, with a yield of about 16% carbonyl sulfide measured. By difference, the elemental sulfur yield was about 42%. Thus, approximately three quarters of the hydrogen sulfide which reacted was converted to elemental sulfur and one quarter was converted to carbonyl sulfide.

A slight decrease in the concentrations of carbon monoxide and hydrogen can be noted from the feed to the product analyses, as well as a slight increase in concentration of carbon dioxide. These changes would indicate some undesirable reaction over the catalyst between the feed oxygen and the major components of the syngas, but the preliminary "oxygen balance" did not close very well. The measured decrease in oxygen was close to that calculated for the hydrogen sulfide reactions, but less than the total calculated oxygen consumption, when the reactions of oxygen with CO and hydrogen are included. Either there were surface reactions with oxygen which had not yet reached steady-state, or the analytical precision on CO, hydrogen, and/or carbon dioxide are insufficient for monitoring these side reactions.

During Period B, as the ratio of oxygen to hydrogen sulfide increased, the product hydrogen sulfide concentration dropped considerably in the first analyses, and then increased somewhat. In hindsight, the product concentration of hydrogen sulfide may have been increasing somewhat as the sampling was changed back from the product to the feed, but the concentration of carbonyl sulfide was stable.

The hydrogen sulfide conversion was about 63% at the end of this period, with a yield of about 15% carbonyl sulfide measured. By difference, the elemental sulfur yield was about 48%. Thus, slightly more than three quarters of the hydrogen sulfide which reacted was converted to elemental sulfur and less than one quarter was converted to carbonyl sulfide.

For this experimental period, there was essentially no change between the feed and product concentrations of hydrogen, CO, and carbon dioxide. The oxygen balance closed well, just in consideration of the reactions for oxygen with hydrogen sulfide.

During Period C, as the oxygen to hydrogen sulfide ratio was further increased, from about 0.58 to about 0.72, the product hydrogen sulfide concentration again dropped considerably in the first analyses, and then increased somewhat. The product concentration of hydrogen sulfide may have been increasing somewhat as sampling was changed back from the product to the feed, but the concentration of carbonyl sulfide was again very stable.

The hydrogen sulfide conversion was about 68% for the end of this period, with a yield of 15% carbonyl sulfide measured. By difference, the elemental sulfur yield was about 53%. Thus, somewhat more than three quarters of the hydrogen sulfide which reacted was converted to elemental sulfur and less than one quarter was converted to carbonyl sulfide.

For this experimental period, there were decreases from the feed to the product concentrations of hydrogen and carbon monoxide, but essentially no change in the carbon dioxide concentration. The oxygen balance closed well, just in consideration of the reactions for oxygen with hydrogen sulfide.

During Period D, as the oxygen to hydrogen sulfide ratio was increased further, from about 0.75 to about 0.90, the product hydrogen sulfide concentration again dropped measurably in the first product analyses, and then increased somewhat. There appeared to be a period of stabilization in the product hydrogen sulfide concentration, but then it appeared to begin increasing again. The product concentration of hydrogen sulfide may have been increasing somewhat as the sampling was changed back from the product to the feed, but the concentration of carbonyl sulfide was again very stable.

The hydrogen sulfide conversion was about 69% at the end of this period, with a yield of a little less than 15% carbonyl sulfide measured. By difference, the elemental sulfur yield was about 54%. The conversion of hydrogen sulfide and the yield of carbonyl sulfide had not changed much from the last incremental increase in oxygen in the feed.

For this experimental period, there again appeared to be a very slight decrease from the feed to the product concentrations of hydrogen and carbon monoxide, and a slight increase in the carbon dioxide concentration. The oxygen balance again closed well, just in consideration of the reactions for oxygen with hydrogen sulfide.

EXAMPLE 2

Figure 1B:
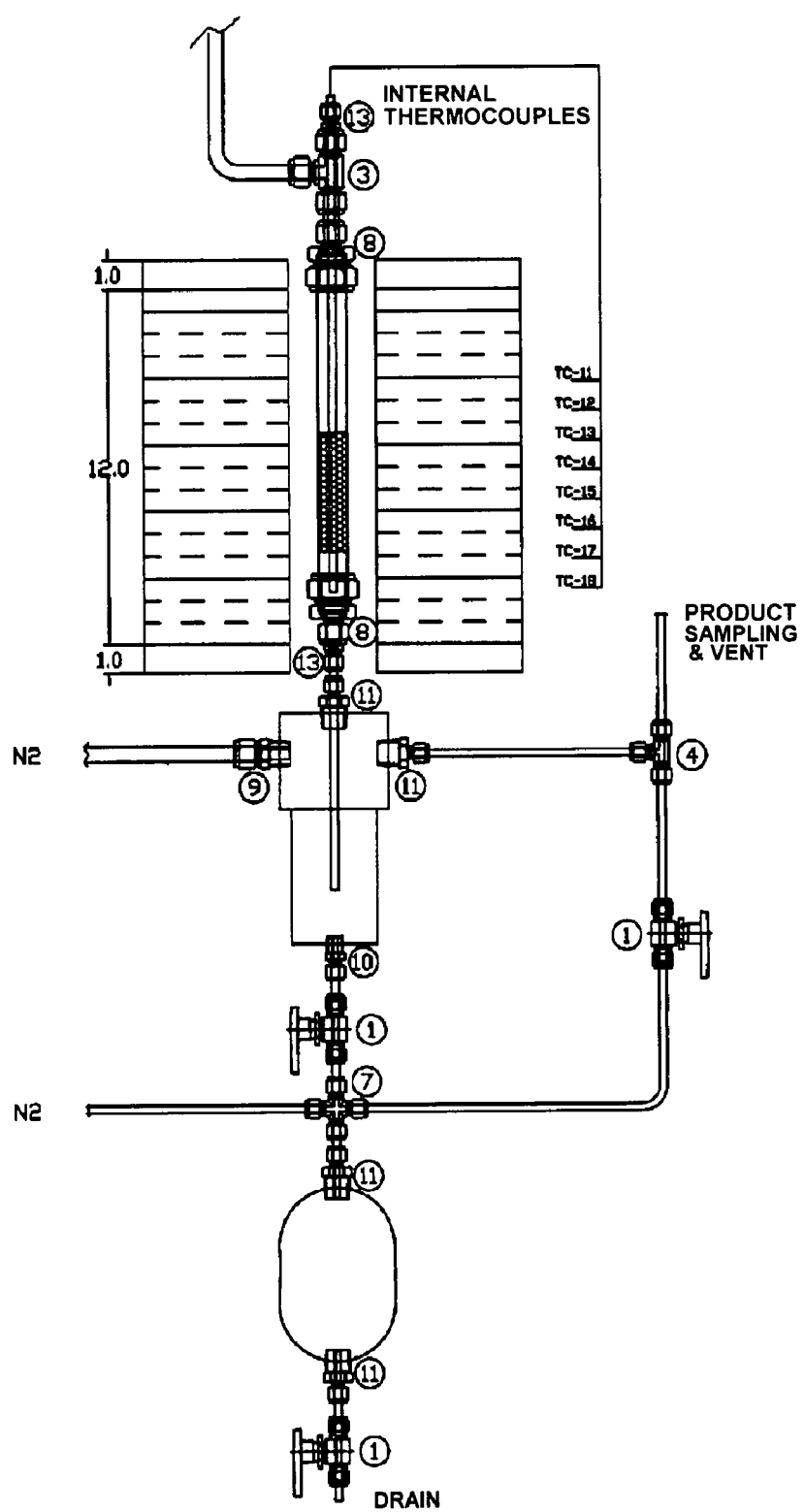
Figure 2:
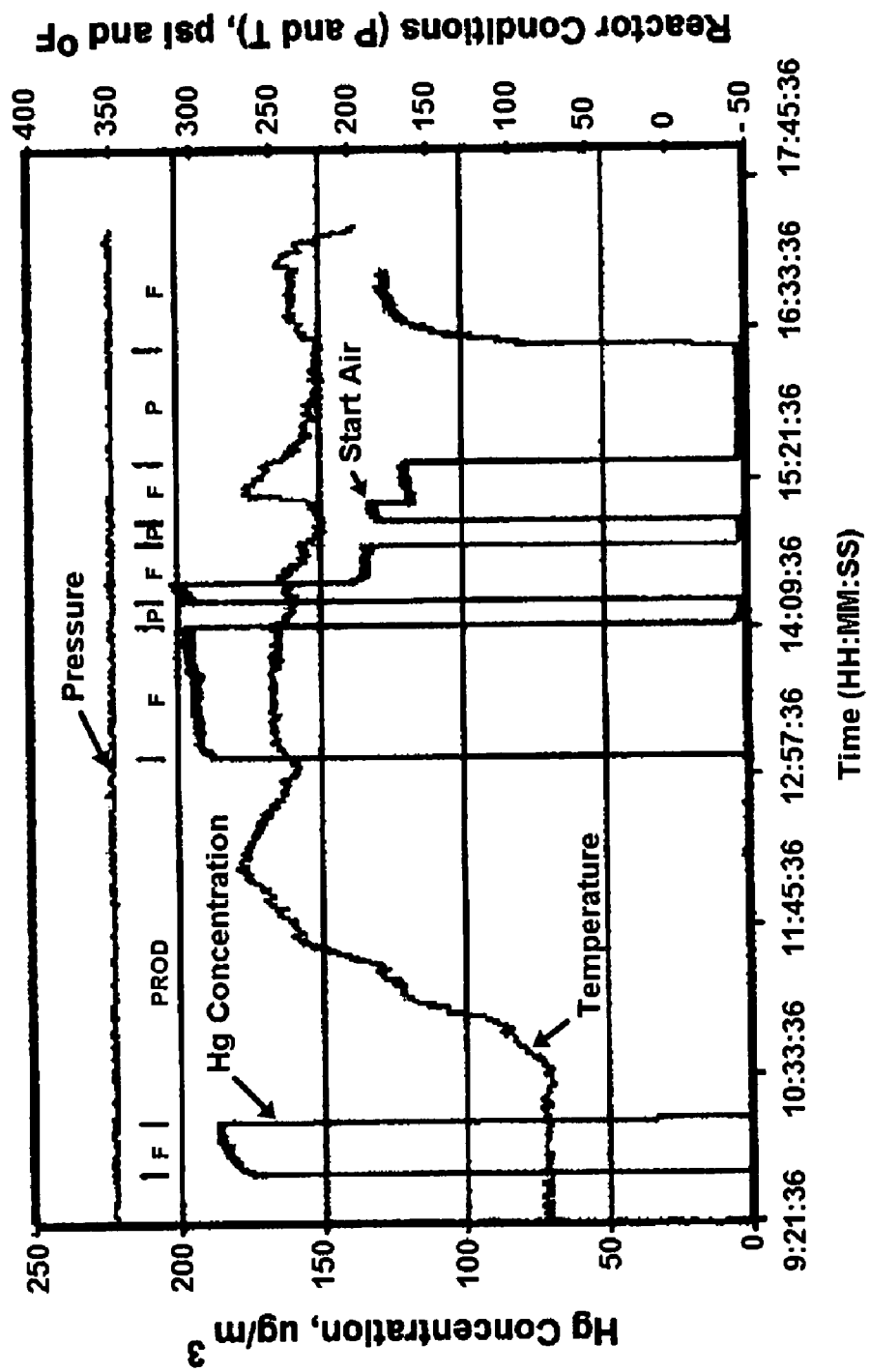
FIG. 2 is a diagram showing the results obtained using the DO-CTU of FIG. 1.

In this example, a series of tests employing an upgraded 1-inch (new tubular, with inert coating) reactor (DO-CTU) as shown in FIGS. 1a and 1b was conducted. The reactor and product-recovery sections of the unit, coated with an inert material by Restek Corporation, Bellefonte, Pa., were designed for minimum surface area/minimum hold-up volume. The main objectives of these tests were (1) to check direct oxidation performance at low catalyst temperature and low volumetric space velocity and (2) to measure the capability of the system for capturing mercury vapor in a blended syngas feed in a direct oxidation environment.

Tests were first done on the CTU system with only nitrogen flow, with mercury added to the feed through the heated permeation tube. For both a cold and a hot system, the concentration of mercury added to the feed was measured at almost the same level in the product system. Therefore, the CTU upgrading was deemed to have been successful. The 1-inch tubular reactor was then loaded with a 55 gram sample of a catalyst (CRS-31 available from Axens North America) in the form of 3 mm extrudates, loaded neat with no glass beads or other diluent in the reactor. The length of diluted catalyst was about 7 inches.

The DO-CTU system was pressured to 360 psig with nitrogen, and a nitrogen flow was established. The system was heated with flowing nitrogen to a catalyst temperature of about 300° F. When temperatures had stabilized, hydrogen sulfide, carbon dioxide, carbon monoxide, and hydrogen were blended into the nitrogen feed gas. After these flows had stabilized for about forty-five minutes, air was added to the feed blend. The concentration of mercury in the feed was about 300 mg/m$^3$; in the product, before the addition of the syngas components, the concentration of mercury was lower, at about 150 μg/m$^3$. This indicates that the hot catalyst may have been adsorbing some mercury from the feed gas. However, when the air was added to the feed gas to establish the direct oxidation operations, the level of mercury in the product gas decreased to substantially zero.

After about one hour of the direct oxidation operations, the syngas components were removed from the feed gas stream, and only nitrogen flowed over the catalyst as the CTU heaters were turned off and the unit was de-pressured. With syngas concentrations of about 8% for hydrogen, 10% for carbon monoxide, and 6200 ppm of hydrogen sulfide, the conversion of hydrogen sulfide was leveling off at about 55% at the end of the experiment. Very little carbonyl sulfide was measured—about 40 ppm; this yield would be about 0.65%, based on feed concentration, or about 1.1% yield, as a percentage of the hydrogen sulfide which was reacted. There was essentially no mercury in the product syngas, and there was no measurable oxidation of the syngas components hydrogen or carbon monoxide. This was accomplished at a pressure of 350 psig, a catalyst temperature of less than 300° F., and a volumetric space velocity of about 880 Hr-1.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for removal of hydrogen sulfide from a hydrogen sulfide-containing gaseous stream comprising the steps of:
   introducing a feed consisting essentially of said hydrogen sulfide-containing gaseous stream and an oxidizing agent into a catalytic reactor containing a hydrogen sulfide conversion catalyst at a temperature one of less than and equal to a dewpoint of elemental sulfur in the catalytic reactor; and
   oxidizing the hydrogen sulfide in the catalytic reactor, forming elemental sulfur.

2. A method in accordance with claim 1, wherein the hydrogen sulfide-containing gaseous stream has a flow rate suitable for providing a space velocity in a range of about 100 to about 2000 VHSV.

3. A method in accordance with claim 1, wherein a ratio of oxygen to hydrogen sulfide in the catalytic reactor is one of greater than and equal to about 0.5.

4. A method in accordance with claim 1, wherein the hydrogen sulfide-containing gaseous stream is a synthesis gas from a gasification process.

5. A method in accordance with claim 4, wherein the hydrogen sulfide-containing gaseous stream is at a pressure substantially corresponding to a gasifier pressure of a gasifier employed in the gasification process.

6. A method in accordance with claim 1, wherein at least a portion of the elemental sulfur is condensed from an effluent stream exiting from the catalytic reactor.

7. A method in accordance with claim 1, wherein said hydrogen sulfide-containing gaseous stream further comprises mercury.

8. A method in accordance with claim 7, wherein said mercury (Hg) in said hydrogen sulfide-containing gaseous stream is simultaneously removed with said hydrogen sulfide.

* * * * *